Oct. 25, 1966     E. C. RANGUS     3,280,468
COMBINED GAUGE AND GUARD FOR A RECIPROCATING CLIPPER
Filed April 19, 1963

INVENTOR.
ERNEST C. RANGUS
BY
Leonard S. Knox
ATT'Y.

United States Patent Office 3,280,468
Patented Oct. 25, 1966

3,280,468
COMBINED GAUGE AND GUARD FOR A
RECIPROCATING CLIPPER
Ernest C. Rangus, Lombard, Ill., assignor to Supreme
Products Corporation, Chicago, Ill.
Filed Apr. 19, 1963, Ser. No. 274,279
7 Claims. (Cl. 33—185)

This invention relates to a device useful with reciprocating clippers, e.g. a hair clipper, having the dual function of assisting in accurate positioning of the teeth of the fixed and movable blades for optimum efficiency of shear and of guarding the blades when the clipper is idle. The invention is not limited to clippers or similar shearing machines which have a movable blade cooperative with a fixed blade but is equally adaptable to those which may have both blades movable, although the former type is more commonly encountered.

In many designs of clippers for cutting hair the apices of the teeth of the movable blade are set back of the apices of the teeth of the fixed blade in order that the hairs may enter the cutting area and there held momentarily in a supported state during shear. In the field of clippers generally the respective groups of apices may be in alignment and a comb forming a part of the clipper depended upon to support the hairs.

The present invention has for its principal object a gauge and guard combined in a single device in order to facilitate accurate, predetermined relative location of the movable blade to the fixed blade and, when not used as a gauge, left in position to protect the blades during periods of non-use.

Another object is to provide a device for the function aforesaid which is so constructed and arranged as to lend itself largely to molding in one piece of plastic composition by means of a comparatively inexpensive mold, having in mind that plastic composition is least likely to injure the teeth of the blades.

A further object is to provide a device for the purposes stated which is adapted for use by unskilled persons, namely, those employing reciprocating clippers for home barbering or the trimming of dogs.

An additional object is to provide a device as aforesaid which may be kept in position during the steps of adjustment, that is to say, in a position allowing access to the screws holding the adjustable blade, usually the fixed blade.

Other objects and advantages will become apparent from the ensuing description which, taken with the accompanying drawing, discloses a preferred mode of carrying the invention into practice.

In the drawing:

FIG. 2 is an end elevation of the device in its relation to the blades;

Broadly regarded, the invention device comprises a body preferably molded in one piece of reasonably tough plastic composition, e.g. nylon, having an inner face substantially conforming to the exterior configuration of the adjustable blade to be positioned thereagainst. On one side the device has one or more overhanging ledges defining with said inner face an undercut or recess which is abutted with an apical region of the teeth of the adjustable blade. At the opposite side of the device opposite the recess there is provided a resilient clip engaging that edge of the adjustable blade opposite the toothed edge whereby the device is reliably engaged with the blade during adjustment. If desired, the resilient clip may be an integrally molded part of the device. A ledge or ledges which, in part, defines the tooth-engaging recess, has a surface confronting the teeth of the blade not subject to adjustment in order that when adjustment is being made the recess and ledge respectively, define the spacing between the apices of the fixed and movable teeth. The body of the device is conformed for access to the screws securing the adjustable blade to the body of the clipper. In addition to its function as a gauge, the device is so constructed and arranged that it may be used as a guard to protect the teeth of the blades against injury when the clipper is out of use. In a modified aspect the device may carry a leaf spring to insure that the same is positively maintained in its proper position during adjustment.

Figure 1:
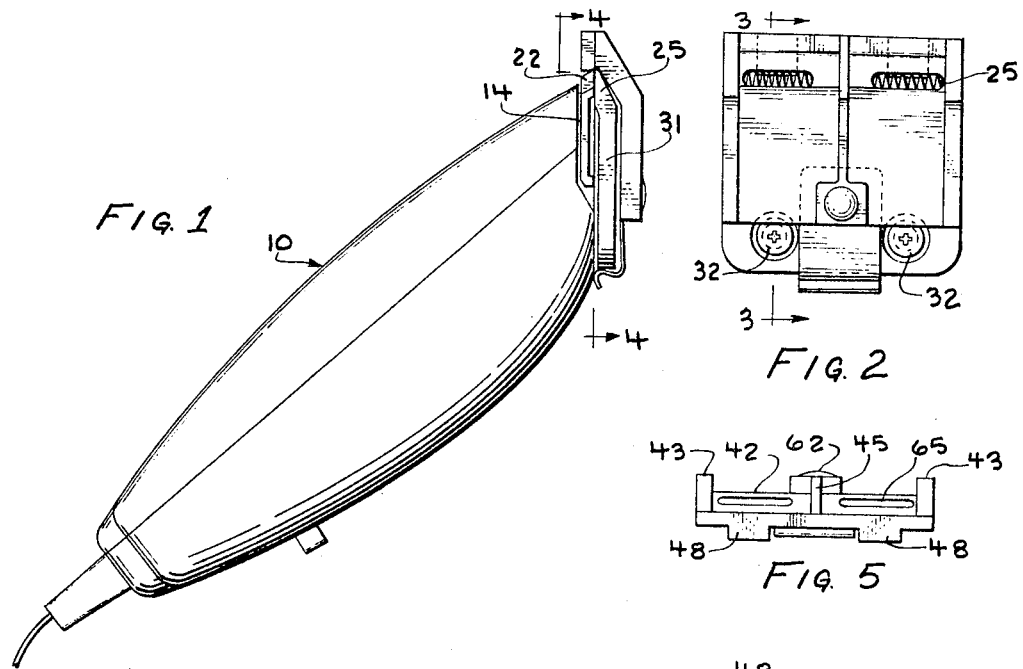
FIG. 1 shows, in side elevation, a hair clipper with the invention device in position for use as a gauge or as a guard.

Thus, reverting to the drawing (FIG. 1), there is shown, by way of example, a clipper of that type designed primarily for shearing hair, viz. barbering or the trimming of animal hair. The casing 10 houses some suitable operating mechanism, e.g. an electric motor (not shown) driving an arm 11 articulated with a movable cutting blade 14 (FIG. 3) adapted for reciprocating motion in a path which, in FIG. 2, may be considered as horizontal. Guiding of the movable blade in its path is not dependent on the lateral or vertical positioning of the fixed blade 15 since this latter is to be adjustable independently of the movable blade. The movable blade is therefore guided by the nature of the arm 11 which drives it, or in any other suitable manner, e.g. a guide which is on the housing 10. However, such guiding means forms no part of the present invention per se. Accordingly, within the purview of the invention, the apices 21 of the movable teeth 22 may be regarded as a line with reference to which the apices 24 of the fixed teeth 25 are to be caused to take up some predetermined position. Insofar as concerns the invention, the apices 21 and 24 of the two sets of teeth 22 and 25, are not critical in shape and dimensions, except that, in general, they are beveled on their outer faces and the apices 24 may be blunt, as shown, to avoid injury to the flesh.

The fixed blade usually has a rectangular periphery and is mounted rigidly on the casing 10 by a pair of screws 32 passing through vertically-slotted holes 33 in the blade and threadedly received in the casing 10, there being a surface 34 upon which the blade bears to preserve its operative position. It should be noted that the slotted holes 33 also have some slight degree of lateral clearance to allow for limited tilting of the fixed blade during adjustment.

Figure 5:
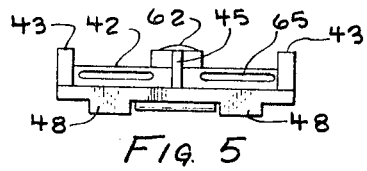
FIG. 5 is a bottom plan view of the device as illustrated in FIG. 4.
Figure 4:
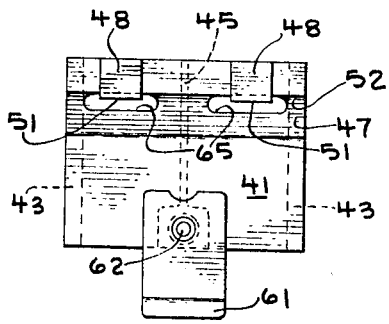
FIG. 4 is a view of the device proper as seen in the direction of the arrows 4—4 in FIG. 1.
Figure 3:
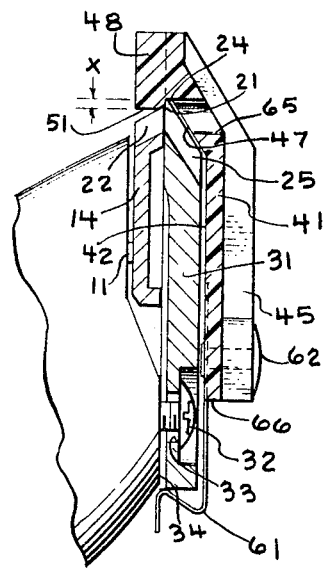
FIG. 3 is an enlarged cross-section taken on the lines 3—3 of FIG. 2.
Figure 6:
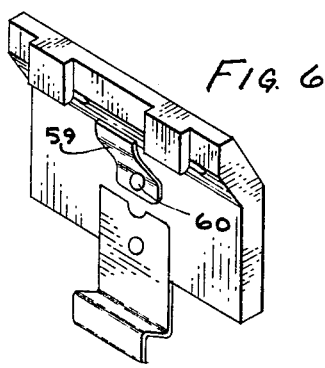
FIG. 6 is a detail of an alternative form of the device.

The invention device is preferably molded of plastic composition lending itself to sharp definition of the various surfaces, to protection of the teeth and to resistance to fracture. Nylon is preferred as suiting these several purposes although various other plastics may serve. Referring to FIGS. 3, 4 and 5, the device has a generally rectangular body 41 which is flat on its inner face 42 and is rigidified by ribs 43 at each side and by a central rib 45. At its upper region the face 42 has an inclined surface 47 substantially parallel to the bevel of the teeth 25 but with some slight clearance therebetween. Beyond the surface 47 there is a pair of ledges 48 each having a fiducial surface 51 adapted to abut the apices 21 of the movable teeth 22. These ledges could, alternatively, be a continuous, single ledge except that, for reasons which will appear subsequently, a pair of spaced-apart ledges, as shown, is preferred. It will be evident that a pair of spaced-apart ledges is the equivalent of a single, extended ledge, inasmuch as the apices 21 are in a straight line.

Assuming that the two sets of teeth are to occupy a relative position in which the movable teeth are positioned back of the fixed teeth by some predetermined amount, say $\frac{1}{32}$", the ledges 48 will overhang the body by an amount $X = \frac{1}{32}$". Between the surface 47 and the ledges 48 the conformation of the body will be such as to provide a second fiducial surface 52 to be abutted by the teeth 25. Such surface 52 may be regarded as defining the floor of a pair of recesses, with the inner face of the ledges as one side wall and the surface 47 as the other.

A resilient clip 61 is secured to the body 41 by means of a rivet 62, the distal end of the clip being arranged to grip the lower edge of the blade 15 whereby the device may retain its position during adjustment of the tooth spacing and during idle periods of the clipper. If desired, the clip may be molded as an integral part of the device.

The use of the device as a guard is believed to have become obvious from the preceding description. To adjust the fixed blade 15 the device is "hooked" over the teeth 25 and the clip 61 engaged to occupy the position shown in FIGS. 2 and 3. The screws 32 are loosened, whereupon the blade and the thereto-secured device may be shifted vertically and/or tilted, by virtue of the play between the screws 32 and holes 33, until the surface 51 rests on the apices 21 whereupon the screws are retightened. The operation is extremely simple and foolproof. To allow access to the screws during adjustment, the lower edge 66 terminates above the screw heads. Alternatively, the edge 66 may be at a lower elevation and access openings for the screws provided in the body 41. It will be understood that the clearance between the back face of the teeth 25 and the surface 47 heretofore mentioned is minimal in order that the apieces 21 are not permitted to cam the ledges 48 to the left, for otherwise error may be introduced into the adjustment. In the event the apieces 21 are blunt in the same fashion as the apices 24, the clearance mentioned need not be so critical. However, in general, the teeth of the movable blade will be pointed in order to facilitate movement of the clipper as cutting proceeds, as for example, where the hair is curly. It will therefore be understood that, because of the clearance existing at the back of the teeth 25, the device would be held to the right to insure that the apices 21, although sharp, are caused to abut the surface 51. If desired, a leaf spring 59 may be affixed by a rivet 60 to the face 42 with its free end abutting the confronting face of the fixed blade in order to insure that the surfaces 51 are properly in abutment with the apices 21. Alternatively, the spring 59 may be simply an upward extension of the clip 61.

In order to simplify the mold utilized for the plastic portion of the device, the overhanging portion of the ledges 48 is defined by a pair of flat-ended, fixed projections or cores protruding from the face of the mold cavity. These, in turn, for esthetic reasons, have semi-cylindrical sides thereby giving rise to a pair of openings 65 in the body 41. These openings, while a necessary result of utilizing the said cores, do serve a useful purpose in that the teeth 25 are visible therethrough (FIG. 2) and therefore provide a double check, so to speak, of the position of the device during the adjusting period. If the expedient of using the said cores in the mold cavity were not availed of, a somewhat complicated, movable set of cores would be required as part of the mold, thereby adding substantially to the cost of the piece part.

While I have show particular embodiments of my invention, it will be understood, of course, that I do not wish to be limited thereto since many modifications may be made and I, therefore, contemplate by the appended claims to cover any such modifications as fall within the true spirit and scope of my invention.

I claim:

1. A dual-function device to aid in the setting of the predetermined relative displacement of the apices of the respective sets of teeth of the contiguous fixed and movable shearing blades of a clipper and to protect the teeth when the clipper is idle, there being means associated with the fixed blade to adjustably fix the position thereof comprising: a body portion having two, mutually perpendicular, fiducial surfaces, one of said surfaces adapted to abut the apices of the teeth of the fixed blade and the other of said surfaces being adapted to abut the face of the fixed blade which is contiguous to the movable blade and a third fiducial surface adapted to abut the apices of the teeth of the movable blade, said first one of said surfaces and said third surface being displaced from each other in the direction of the plane of contiguity of the blades by the amount of the said predetermined relative displacement of the sets of apices measured in said plane, means to detachably secure the device on the fixed blade, said first and third surfaces being at least coextensive with said sets of teeth respectively to protect the same when the clipper is idle.

2. A dual-function device to aid in the setting of the predetermined relative displacement of the apices of the respective sets of teeth of the fixed and movable contiguous shearing blades of a clipper and to protect the teeth when the clipper is idle, there being means associated with the fixed blade to adjustably fix the position thereof and said fixed blade having an outwardly sloping face portion extending away from the apices of the teeth thereof continuing into a face portion parallel to the plane of contiguity of the blades comprising: a body portion having a recess, one side wall of the recess being adapted to abut that face of the teeth of the fixed blade in the plane of contiguity, an opposite wall of the recess being sloped homologously to said sloping face portion of the fixed blade and said recess having a floor presenting a fiducial surface abutting the apices of the teeth of the fixed blade, said body portion having a second fiducial surface offset from said first fiducial surface in the direction of the plane of contiguity to abut the apices of the teeth of the movable blade, said offset being the amount of said predetermined displacement of the two sets of apices, said two fiducial surfaces being joined by a third surface to abut the face of the fixed blade in the plane of contiguity, said first and second surfaces being at least coextensive with said sets of teeth respectively to protect the same when the clipper is idle.

3. The combination in accordance with claim 1 wherein said first surface is the floor of a recess in said body and said second and third surfaces are faces of a ledge overhanging said first surface.

4. The combination in accordance with claim 1 wherein said detachably securing means is a resilient, cantilevered clip affixed to said body having its distal end adapted to frictionally engage an edge of the fixed blade opposite the toothed edge thereof.

5. The combination in accordance with claim 3 further characterized in that said body has a resilient member secured thereto, said member, when the device is operative position, bearing on the fixed blade to urge said ledge against that face of the fixed blade in the plane of contiguity of the blades to present said third fiducial surface positively to the apices of the teeth of the movable blade.

6. The combination in accordance with claim 1 further characterized in that said body has a face confronting the exterior face of the fixed blade, homologous therewith and intersecting said first fiducial surface.

7. The combination in accordance with claim 2 further characterized by means forming part of the device to detachably secure the same to the fixed blade.

References Cited by the Examiner

UNITED STATES PATENTS

| | | | |
|---|---|---|---|
| 1,445,041 | 2/1923 | Redman | 30—200 |
| 1,678,030 | 7/1928 | Yount | 33—185 X |
| 2,006,854 | 7/1935 | Winter | 33—185 |
| 3,041,726 | 7/1962 | Hitson | 30—201 |
| 3,069,780 | 12/1962 | Miller et al. | 33—185 |

FOREIGN PATENTS

| | | |
|---|---|---|
| 429,483 | 7/1911 | France. |

LEONARD FORMAN, *Primary Examiner.*

SAMUEL S. MATTHEWS, *Examiner.*